US012628842B2

(12) United States Patent
Wooster et al.

(10) Patent No.: US 12,628,842 B2
(45) Date of Patent: May 19, 2026

(54) METHOD OF IMPROVING THE TEXTURE AND FUNCTIONALITY OF A DRY FRACTIONATED PLANT PROTEIN CONCENTRATE BEVERAGE

(71) Applicant: SOCIETE DES PRODUITS NESTLE S.A., Vevey (CH)

(72) Inventors: Timothy James Wooster, Orbe (CH); Marina Bortolin, Gollion (CH); Ludovic Penseyres, Penthalaz (CH); Pierre-Alain Richon, Villeneuve (CH); Christina Vafeiadi, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 324 days.

(21) Appl. No.: 18/044,663

(22) PCT Filed: Sep. 10, 2021

(86) PCT No.: PCT/EP2021/074967
§ 371 (c)(1),
(2) Date: Mar. 9, 2023

(87) PCT Pub. No.: WO2022/053631
PCT Pub. Date: Mar. 17, 2022

(65) Prior Publication Data
US 2023/0329260 A1      Oct. 19, 2023

(30) Foreign Application Priority Data
Sep. 10, 2020    (EP) ..................................... 20195595

(51) Int. Cl.
*A23C 11/10*        (2025.01)
*A23J 3/14*         (2006.01)
(Continued)

(52) U.S. Cl.
CPC ............... *A23C 11/103* (2013.01); *A23J 3/14* (2013.01); *A23J 3/346* (2013.01); *A23L 11/60* (2021.01); *A23L 29/015* (2016.08); *A23L 29/06* (2016.08)

(58) Field of Classification Search
CPC ..... A23J 1/14; A23J 3/14; A23J 3/346; A23C 11/103; A23L 11/60
See application file for complete search history.

(56) References Cited

U.S. PATENT DOCUMENTS 4,259,358 A * 3/1981 Duthie ................. A23K 20/147
426/598
10,172,381 B2   1/2019 Vrljic et al.
(Continued)

FOREIGN PATENT DOCUMENTS

CA        2982280 A1      4/2019
CA        3079130 A1      6/2019
(Continued)

OTHER PUBLICATIONS

Silva et al. "Health issues and technological aspects of plant-based alternative milk" Food Research International, 2020, vol. 131, 18 pages.
(Continued)

*Primary Examiner* — Michele L Jacobson
(74) *Attorney, Agent, or Firm* — K&L Gates LLP

(57) ABSTRACT

The invention relates in general to a method of making a plant based liquid, said method comprising dispersing triglyceride in a plant protein mixture; forming an emulsion; applying a thermal treatment to the emulsion; and applying a shear treatment to the thermal treated emulsion to form a plant based liquid.

20 Claims, 16 Drawing Sheets

(51) Int. Cl.

| | |
|---|---|
| *A23J 3/34* | (2006.01) |
| *A23L 11/60* | (2025.01) |
| *A23L 29/00* | (2016.01) |

(56) References Cited

U.S. PATENT DOCUMENTS

| | | | | |
|---|---|---|---|---|
| 2002/0106437 | A1 * | 8/2002 | Karleskind | A23C 9/1315 |
| | | | | 426/590 |
| 2011/0034394 | A1 * | 2/2011 | Kaae | A23L 33/14 |
| | | | | 426/62 |
| 2012/0135125 | A1 | 5/2012 | Muschiolik et al. | |
| 2015/0313269 | A1 | 11/2015 | Rodríguez | |
| 2018/0295849 | A1 | 10/2018 | Earl et al. | |
| 2019/0000112 | A1 | 1/2019 | Kizer et al. | |
| 2019/0021387 | A1 | 1/2019 | Barata et al. | |
| 2019/0320689 | A1 | 10/2019 | Beliciu et al. | |

FOREIGN PATENT DOCUMENTS

| | | | |
|---|---|---|---|
| CA | 3115191 | A1 | 4/2020 |
| CN | 102711492 | A | 10/2012 |
| CN | 109310102 | A | 2/2019 |
| CN | 111296586 | A | 6/2020 |
| JP | H10215782 | A | 8/1998 |
| WO | 2006124598 | A2 | 11/2006 |
| WO | 2013173869 | A1 | 11/2013 |
| WO | 2018122021 | A1 | 7/2018 |
| WO | 2019115280 | A1 | 6/2019 |
| WO | 2020123915 | A1 | 6/2020 |

OTHER PUBLICATIONS

Chinese Office Action for Appl No. 202180062276.0 dated Mar. 3, 2025, 7 pages.

Japanese Office Action for Appl No. 2023-514914 dated Oct. 7, 2025, 4 pages.

Aydar et al., "Plant-Based Milk Substitutes: Bioactive Compounds, Conventional and Novel Processes, Bioavailability Studies, and Health Effects", Journal of Functional Foods, vol. 70, 2020, pp. 1-15.

Bogahawaththa et al., "Impact of Controlled Shearing on Solubility and Heat Stability of Pea Protein Isolate Dispersed in Solutions with Adjusted Ionic Strength", Food Research International, vol. 125, 2019, pp. 1-9.

Martinez-Monteagudo et al., "Improvements in Emulsion Stability of Dairy Beverages Treated by High Pressure Homogenization: A Pilot-Scale Feasibility Study", Journal of Food Engineering, vol. 193, 2017, pp. 42-52.

* cited by examiner

A)

B)

A)

B)

A)     B)     C)

C)

D)

A)

B)

A)

B)

C)

D)

A)

B)

C)                    D)                    E)

A)

B)

C)

D)

A)

0% sodium bisulfite          0.03% sodium bisulfite

A)

After UHT                                    50 μm

B)

C)

METHOD OF IMPROVING THE TEXTURE AND FUNCTIONALITY OF A DRY FRACTIONATED PLANT PROTEIN CONCENTRATE BEVERAGE

CROSS REFERENCE TO RELATED APPLICATIONS

The present application is a National Stage of International Application No. PCT/EP2021/074967, filed on Sep. 10, 2021, which claims priority to European Patent Application No. 20195595.2, filed on Sep. 10, 2020, the entire contents of which are being incorporated herein by reference.

FIELD OF INVENTION

The present invention relates to plant based (non-dairy) milk alternative beverage compositions and to the process for producing said compositions.

BACKGROUND TO THE INVENTION

Recent years have seen a huge growth in demand for plant based (non-dairy) milk alternative products. Non-dairy milk alternatives can be used in place of milk in a wide variety of applications such as (non) flavoured beverages, whitening agents with hot and cold beverages such as, for example, coffee, cocoa, tea, or added on top of cereal. Non-dairy milk alternatives may come in a variety of different flavours and provide mouthfeel, body, whitening and a smooth texture.

Consumers are seeking plant based milk alternatives that are sustainable and deliver neutral taste, a milk like appearance, a pleasing low viscosity texture and the ability to cream foams with the milk. However, plant based ingredients are often associated with negative aromas and off tastes. The appearance, texture, and functionality of many plant based products can also further limit their appeal to the consumer.

Plant based dairy alternatives are largely manufactured using protein isolates which require large amounts of water and chemicals to purify the protein from the raw plant flour. The presence of starch and fibres in the source protein can also lead to gelation of the product, or sedimentation of the starch and/or fibres. Gelation of the beverage product and/or viscosity build up upon heat treatment leads to products with an excessively thick texture decreasing consumer appeal and product functionality and processability. Plant based dairy alternatives are also known to have a brown or grey colour negatively affecting consumer appeal due to a lack of similarity to milk whiteness.

There is a clear need to develop new process and recipe solutions to deliver tasty, nutritious and affordable plant based dairy alternatives with appealing low viscosity and the visual appearance of milk.

SUMMARY OF THE INVENTION

The inventors have developed a method which solves the abovementioned problems and leads to a superior plant based liquid beverage.

In a first aspect, the invention relates to a method of making a plant based liquid, said method comprising dispersing triglyceride in a plant protein mixture; forming an emulsion; applying a thermal treatment to the emulsion; and applying a shear treatment to the thermal treated emulsion to form a plant based liquid.

In a second aspect, the invention relates to a plant based liquid made by a method as described herein.

In a third aspect, the invention relates to the use of thermal treatment followed by shear treatment to form a plant based liquid from an emulsion comprising a plant protein mixture.

EMBODIMENTS OF THE INVENTION

Figure 1:
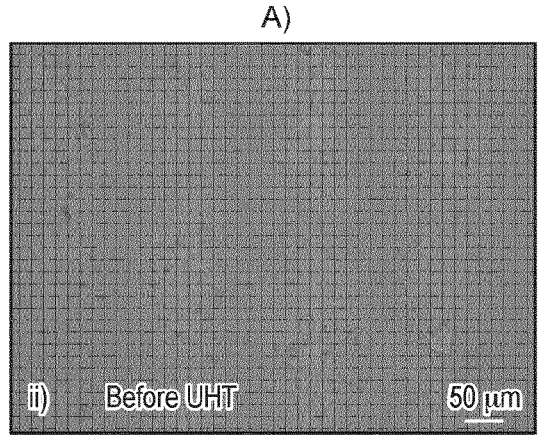
FIG. 1: Change in pea concentrate milk (6.5% pea concentrate, 2.6% fat, 0.8% sucrose) A) microscopy DIC ×10 i) before and ii) after UHT, B) viscosity, before and after direct UHT heat treatment (143° C., 5 second).
Figure 1:
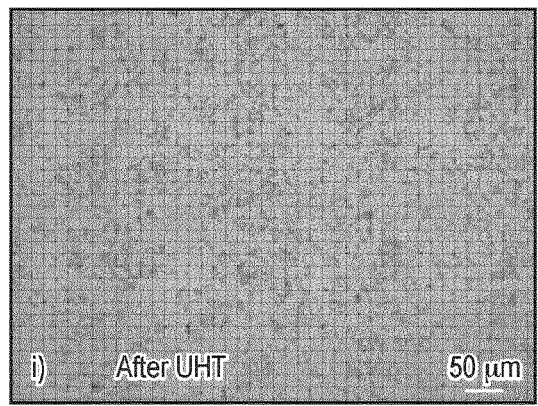
Figure 1:
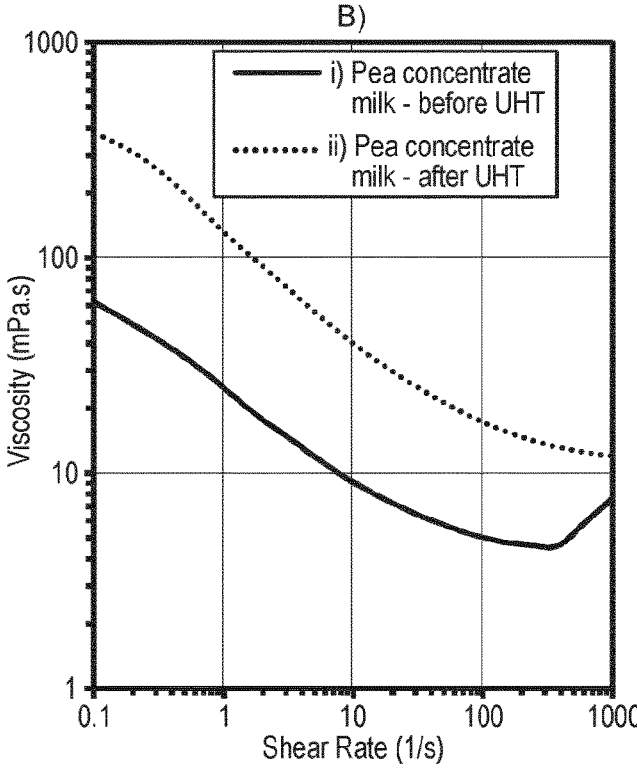

The invention relates in general to a method of making a plant based liquid, said method comprising dispersing triglyceride in a plant protein mixture; forming an emulsion; applying a thermal treatment to the emulsion; and applying a shear treatment to the thermal treated emulsion to form a plant based liquid.

In particular, the invention relates to a method of making a plant based liquid, said method comprising dispersing triglyceride in a plant protein mixture, wherein the plant protein mixture is formed by dissolving a dry fractionated plant protein in water; forming an emulsion; applying a thermal treatment to the emulsion; and applying a shear treatment to the thermal treated emulsion to form a plant based liquid.

More specifically, the invention relates to a method of making a plant based liquid, said method comprising
  a. Dissolving a plant protein in water to form a plant protein mixture with a pH between 6.7 and 9, preferably 6.7 and 8;
  b. Optionally incubating the plant protein mixture with enzymes;
  c. Optionally adding a hydrocolloid(s) to the plant protein mixture;
  d. Dispersing triglyceride in the plant protein mixture;
  e. Homogenizing the plant protein mixture to form an emulsion;
  f. Applying a thermal treatment to the emulsion; and
  g. Applying a shear treatment to the thermal treated emulsion to form a plant based liquid.

More specifically, the invention relates to a method of making a plant based liquid, said method comprising
  a. Dissolving a fractionated plant protein in water to form a plant protein mixture with a pH between 6.7 and 9, preferably 6.7 and 8;
  b. Optionally incubating the plant protein mixture with enzymes;
  c. Optionally adding a hydrocolloid(s) to the plant protein mixture;
  d. Dispersing triglyceride in the plant protein mixture;
  e. Homogenizing the plant protein mixture to form an emulsion;
  f. Applying a thermal treatment to the emulsion; and
  g. Applying a shear treatment to the thermal treated emulsion to form a plant based liquid.

More specifically, the invention relates to a method of making a plant based liquid, said method comprising
  a. Dissolving a dry fractionated plant protein in water to form a plant protein mixture with a pH between 6.7 and 9, preferably 6.7 and 8;
  b. Optionally incubating the plant protein mixture with enzymes;

c. Optionally adding a hydrocolloid(s) to the plant protein mixture;
  d. Dispersing triglyceride in the plant protein mixture;
  e. Homogenizing the plant protein mixture to form an emulsion;
  f. Applying a thermal treatment to the emulsion; and
  g. Applying a shear treatment to the thermal treated emulsion to form a plant based liquid.

In some embodiments, between 0.5 to 20 wt % of dry fractionated plant protein is dissolved to form a plant protein mixture. Preferably, between 1 to 10 wt % of dry fractionated plant protein is dissolved to form a plant protein mixture.

Further ingredients, for example sodium ascorbate, can be added to prevent the formation of an unwanted grey color when making the plant based liquid. In some embodiments, sodium ascorbate is dissolved in the plant protein mixture. Preferably, sodium ascorbate is dissolved in the plant protein mixture or emulsion before step f). In some embodiments, sodium ascorbate or a sodium ascorbate alternative may be used.

The preferred plant protein is a plant protein concentrate. Preferably, the plant protein source is derived from a legume source. In some embodiments, the plant protein source is derived from a legume source such as pea, faba bean, chickpea or lentil, preferably faba bean.

In some embodiments, the dry fractionated plant protein is an air classified plant protein.

In some embodiments, the dry fractionated plant protein has a starch fraction of less than 14 wt % on a dry basis, preferably between 5 to 14 wt % on a dry basis.

In some embodiments, the dry fractionated plant protein has a protein content of at least 50 wt % on a dry basis, or at least 60 wt % on a dry basis, or between 50 to 80 wt % on a dry basis, or between 50 to 70 wt % on a dry basis.

Further ingredients that act as a buffer, as well as sugar, can be added. In some embodiments, a phosphate source is dissolved in the plant protein mixture. In some embodiments, a sugar are dissolved in the plant protein mixture. Preferably, the phosphate source comprises tricalcium phosphate and dipotassium phosphate. Preferably, the sugar is sucrose. In some embodiments, the sugar is a sucrose alternative.

The plant protein mixture is optionally incubated with enzymes to reduce liquid viscosity. In some embodiments, the plant protein mixture is adjusted to a pH of between 7 to 8 followed by incubating with enzymes. In some embodiments, the enzymes are amylase and glycosylate.

The plant protein mixture is emulsified. In some embodiments, the emulsion is formed using a two-stage high pressure homogenizer. In some embodiments, the emulsion average particle size is between 0.1 and 1 μm for d[3,2] and between 0.3 and 2 μm for d[4,3]. Preferably the emulsion average particle size is between 0.1 and 0.7 for d[3,2] and between 0.3 and 1 μm for d[4,3].

A thermal treatment is applied to the emulsion to render it microbiologically stable as well as to reduce its viscosity. In some embodiments, the thermal treatment is ultra high temperature treatment (UHT).

A shear treatment is applied to the thermal treated emulsion. In some embodiments, the shear treatment is applied using a high shear homogenizer. In some embodiments, the viscosity of the plant based liquid after shear treatment is between 0.1 and 100 mPa·s, preferably less between 0.5 and 30 mPa·s, more preferably between 0.5 and 15 mPa·s at a shear rate of 10 s$^{-1}$ at 25° C.

The plant protein mixture is typically low in starch. In some embodiments, the plant based liquid comprises less than 2 wt % starch, preferably less than 1 wt % starch, more preferably less than 0.5 wt % starch.

The plant based liquid can take several forms. In some embodiments, the plant based liquid is a milk analogue.

The invention also provides a plant based milk analogue made by a method as described herein.

The invention also provides a plant based liquid comprising a plant protein source; optionally a hydrocolloid(s); and triglyceride.

In some embodiments, the plant based liquid comprises sodium ascorbate, or a sodium ascorbate alternative.

In some embodiments, the plant protein is a dry fractionated plant protein concentrate.

In some embodiments, the plant protein source is derived from a legume source.

In some embodiments, the plant protein source is derived from a legume source such as faba bean, pea, chickpea or lentil, preferably faba bean.

In some embodiments, the plant based liquid comprises sugar.

In some embodiments, the plant based liquid comprises a phosphate source.

Preferably, the phosphate source comprises tricalcium phosphate and dipotassium phosphate. Preferably, the sugar is sucrose.

In some embodiments, the plant based liquid comprises soluble coffee.

In some embodiments, the plant based liquid has an emulsion average particle size between 0.1 and 1 µm for d[3,2] and between 0.3 and 2 µm for d[4,3]. Preferably the emulsion average particle size is between 0.1 and 0.7 for d[3,2] and between 0.3 and 1 µm for d[4,3].

In some embodiments, the plant based liquid has a viscosity between 0.1 and 100 mPa·s, preferably less between 0.5 and 30 mPa·s, more preferably between 0.5 and 15 mPa·s at a shear rate of 10 s$^{-1}$ at 25° C.

The plant based liquid is typically low in starch. In some embodiments, the plant based liquid comprises less than 2 wt % starch, preferably less than 1 wt % starch, more preferably less than 0.5 wt % starch.

The invention also provides for the use of thermal treatment followed by shear treatment to make a plant based liquid from an emulsion comprising plant protein and triglyceride.

In some embodiments, the plant protein has been incubated with enzymes. Preferably, the enzymes are amylase and glycosylate.

In some embodiments, the emulsion comprises hydrocolloid(s).

In some embodiments, the emulsion comprises sodium ascorbate or a sodium ascorbate alternative.

In some embodiments, the plant protein is a plant protein concentrate. Preferably, the plant protein is a dry fractionated plant protein, for example an air classified plant protein. Preferably, the plant protein source is derived from a legume source. In some embodiments, the plant protein source is derived from a legume source such as pea, faba bean, chickpea or lentil.

In some embodiments, the plant protein concentrate has a maximum moisture content of 8%. In some embodiments, the plant protein concentrate has a minimum protein content of 55% on a dry basis. In some embodiments, the plant protein concentrate has a minimum starch content of 4% on a dry basis. In some embodiments, the plant protein concentrate has a maximum fat content of 4% on a dry basis.

In some embodiments, the plant based liquid comprises sugar. Preferably, the sugar is sucrose.

In some embodiments, the emulsion average particle size is between 0.1 and 1 µm for d[3,2] and between 0.3 and 2 µm for d[4,3]. Preferably the emulsion average particle size is between 0.1 and 0.7 for d[3,2] and between 0.3 and 1 µm for d[4,3].

In some embodiments, the thermal treatment is ultra high temperature treatment (UHT).

In some embodiments, the shear treatment is applied using a high shear homogenizer. In some embodiments, the viscosity of the plant based liquid is between 0.1 and 100 mPa·s, preferably less between 0.5 and 30 mPa·s, more preferably between 0.5 and 15 mPa·s at a shear rate of 10 s$^{-1}$ at 25° C.

In some embodiments, the plant based liquid comprises less than 2 wt % starch, preferably less than 1 wt % starch, more preferably less than 0.5 wt % starch.

DETAILED DESCRIPTION OF THE INVENTION

When a composition is described herein in terms of wt %, this means wt % of the total recipe, unless indicated otherwise.

As used herein, "about" is understood to refer to numbers in a range of numerals, for example the range of −30% to +30% of the referenced number, or −20% to +20% of the referenced number, or −10% to +10% of the referenced number, or −5% to +5% of the referenced number, or −1% to +1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 45 to 55 should be construed as supporting a range of from 46 to 54, from 48 to 52, from 49 to 51, from 49.5 to 50.5, and so forth.

As used herein, an "analogue" of a substance is considered to be a parallel of that substance in regard to one or more of its major characteristics. A "milk analogue" as used herein will parallel milk in the major characteristics of purpose, usage, and nutrition. It has similar levels of energy, protein, carbohydrates, vitamins and minerals. Preferably, the milk analogue is an analogue of cow's milk.

The term "vegan" refers to an edible composition which is entirely devoid of animal products, or animal derived products.

Plant protein sources based on faba, pea, chickpea, lentil, cowpea, pinto bean, mung bean, adzuki bean, common bean, kidney beans, navy beans or similar high carbohydrate (>30 wt %)-low fat (<15%) crops or the like may be used.

Starch degrading enzymes such as amylase, α-amylase (from any species, from *Bacillus amyloliquefaciens, Bacillus licheniformis, Aspergillus oryzae, Aspergillus niger*), more preferably a Saccharifying α-amylase (e.g. from *Bacillus subtilis* (amylosacchariticus), or most preferably an amylase in combination with glucoamylase (also known as amyloglucosidase for example AMG 1100 BG from novozymes) or the like may be used.

Fat sources may include vegetable oils, animal fats, milk fats, fish oil, algal oil, sunflower oil, olive oil, canola oil, cotton seed oil, palm fat, palm stearin, palm kernel oil, corn oil, coconut oil, and/or high oleic acid sunflower oil, any solid fat stock such as refined coconut oil, anhydrous milk fat, hydrogenated vegetable oil, tallow, lard, any nut butter/oil such as almond butter, peanut butter, walnut butter, cashew butter and/or hydrogenated or partially hydrogenated fats. Preferably, the fat source is a plant based fat source, for example vegetable oils, algal oil, sunflower oil, olive oil, canola oil, cotton seed oil, palm fat, palm stearin, palm kernel oil, corn oil, coconut oil, and/or high oleic acid sunflower oil, any solid fat stock such as refined coconut oil, anhydrous milk fat, hydrogenated vegetable oil, any nut butter/oil such as almond butter, peanut butter, walnut butter, cashew butter and/or hydrogenated or partially hydrogenated fats.

Sodium ascorbate alternatives include vitamin C, sodium ascorbate, calcium ascorbate, vitamin C palmitate, fruit juices rich in vitamin C (≥500 mg vitamin C per 100 mL), acerola extract, sodium bisulfite, iodine, potassium iodide, sorbic acid, potassium sorbate, sulfite derivatives such as sodium sulfite, sodium hydrogen sulfite, sodium metabisulfite, potassium metabisulfite, calcium sulfite, calcium hydrogen sulfite.

Buffer alternatives Dipotassium phosphate, trisodium citrate, tripotassium citrate, tripotassium phosphate, sodium bicarbonate, baking soda, bicarbonate of soda, disodium phosphate, trisodium phosphate, monopotassium phosphate, citric acid, lemon juice.

Calcium sources include tricalcium phosphate, calcium carbonate, calcium glycerolphosphate, calcium citrate.

Sucrose alternatives include cane sugar, beat sugar, glucose syrup, maltodextrin, honey and other natural sugar syrups such as agave. Preferably, the sucrose alternative is glucose syrup.

A hydrocolloid means a stabiliser based on (high or low acetyl) gellan, guar gum, (high or low methoxy) pectin, locust bean gum, alginate, carrageenan, carboxymethylcellulose, microcrystalline cellulose, curdlan, xanthan gum or the like may be used. In one embodiment, the hydrocolloid is gellan.

The plant protein mixture is emulsified. In some embodiments, the emulsion is formed using a two-stage high pressure homogenizer. In some embodiments, the fat emulsion average particle size is between 0.1 and 1 μm for d[3,2] and 0.3 and 2 μm for d[4,3], preferably the fat emulsion average particle size is between 0.1 and 0.7 for d[3,2] and 0.3 and 1 μm for d[4,3].

Pasteurization heat treatment can be within a range from 60° C.-100° C. for 1 second to 300 seconds.

Thermal treatment, for example direct and indirect UHT heat treatment can be within a range of 110° C. to 150° C. for 3 seconds to 60 seconds, preferably the thermal heat treatment is indirect heat treatment.

Retort heat treatment the thermal process delivered to this product shall be designed to deliver a lethality (Fo) in the range 5.0-15 minutes (or higher) but in no case shall be lower than 3.0 minutes. Upon establishing the come-up time (CUT) to reach the pre-determined minimum temperature in the retort, a time and temperature range that may satisfy the lethality range is 7-25 minutes at 119-125 deg C. in the sterilization step. The CUT and sterilization time are to be established by a competent thermal process authority.

The plant protein mixture typically contains up to 20 wt % starch, preferably between 2 and 14 wt % and up to 20 wt % fibre, preferably between 6 to 18 wt % on a dry weight basis.

A legume is a plant in the family Fabaceae (or Leguminosae), the seed of such a plant (also called pulse). Legumes are grown agriculturally, primarily for human consumption, for livestock forage and silage, and as soil-enhancing green manure. As used herein, the term "legume" may include: pea, faba bean, chickpea, lentils, kidney beans, navy beans, pinto beans, haricot beans, lima beans, butter beans, azuki beans, mung beans, golden gram, green gram, black gram, urad, scarlet runner beans, rice beans, garbanzo beans, cranberry beans, lima beans, green peas, snow peas, snap peas, split peas and black-eyed peas. Preferably, the legume is selected from pea, faba bean, chickpea, and lentils.

*Vicia faba*, also known in the culinary sense as the broad bean, fava bean, or faba bean, or faba, is a species of flowering plant in the pea and bean family Fabaceae.

By way of example and not limitation, the following examples are illustrative of various embodiments of the present invention.

EXAMPLES

Example 1

Production of Reference Pea Based Liquid

Ingredion Pea Concentrate—Vitessence Pulse 1550 was used as a pea protein source. According to the manufacturer, it is 100% pea protein powder, derived from the dehulled split yellow pea cotyledons of peas (*Pisum sativum*). It has maximum moisture content of 8%, minimum protein content of 55% (dry basis), minimum starch content of 4% (dry basis), and a maximum fat content of 4% (dry basis).

Figure 4:
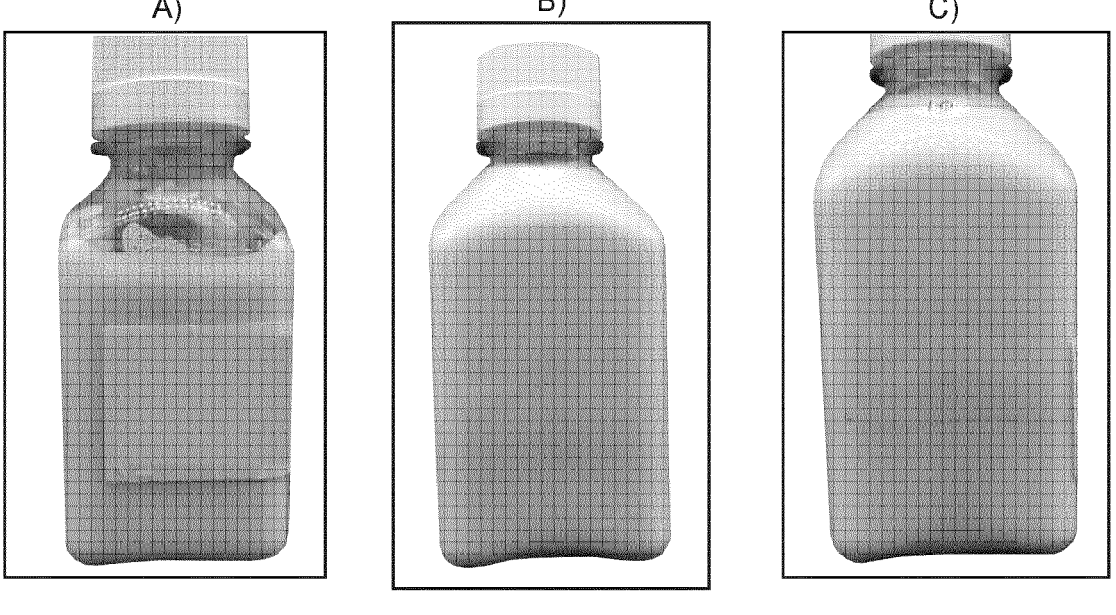
FIG. 4: A) Visual appearance of PEA reference milk after UHT, B) visual appearance of PEA-enzyme milk after UHT, and C) Visual appearance of PEA-shear milk after UHT.

4.3 kg of pea protein concentrate was dissolved in 56.3 kg of water at 50° C. with stirring, to this was added 235 grams of tricalcium phosphate, 100 grams of dipotassium phosphate, and 2 kg of sucrose. This mixture was mixed at 50° C. for 30 minutes to ensure complete dissolution. The pH of the mixture was then adjusted to 7.5 with 1M NaOH. 1.7 kg of oil was then added to the mix then final volume made to 65 litres and the oil was coarsely dispersed using a rotor stator mixer. A fine emulsion with a microscopy picture given in FIG. 1 was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The resulting product was cream in colour, underwent a considerable increase in viscosity/texture (FIG. 1B-ii), and underwent sedimentation over a period of time (FIG. 4A). The dramatic thickening of the product during UHT heat treatment presents a considerable disadvantage for consumers wanting an alternative milk beverage, as the texture of milk is known to by relatively low viscosity.

Example 2

Effect of Enzymatic Treatment on Reducing Viscosity of Pea Based Liquid

To overcome this thickening, the inventors discovered that product viscosity can surprisingly reduce using an enzymatic treatment. A low viscosity pea milk product using enzymatic treatment was produced as follows: 4.3 kg of pea protein concentrate (Ingredion vitessence1550) was dissolved in 56.3 kg of water at 50° C. with stirring, to this was added 235 grams of tricalcium phosphate, 100 grams of dipotassium phosphate, and 2 kg of sucrose. This mixture was mixed at 50° C. for 30 minutes to ensure complete dissolution. The pH of the mixture was then adjusted to 7.5 with 1M NaOH. 52 grams of amylase (BAN480 or BAN 800) and 13 grams of glycosylate (AMG 1100) were dissolved in the pea concentrate mixture. This mixture was incubated at 65° C. for two hours. 1.7 kg of oil was then added to the mix then final volume made to 65 litres and the oil was coarsely dispersed using a rotor stator mixer. A fine

US 12,628,842 B2

Figure 2:
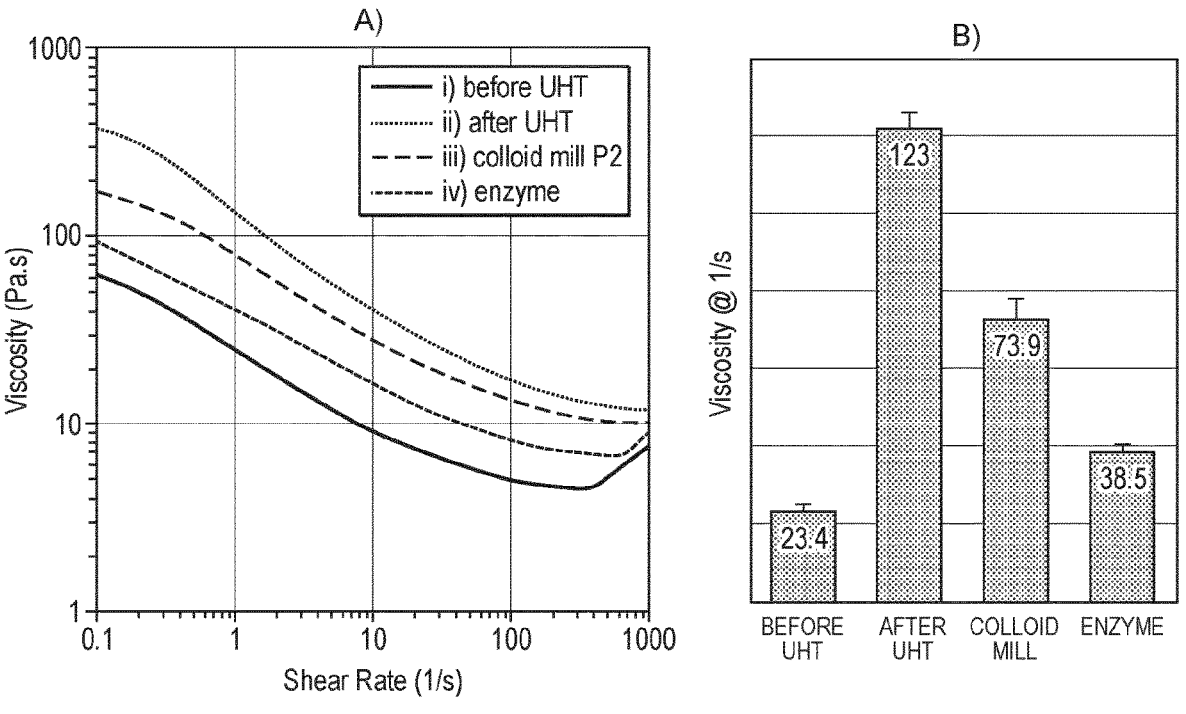
FIG. 2: Change in pea concentrate milk (6.5% pea concentrate, 2.6% fat, 0.8% sucrose) A) and B) viscosity as a function of heat treatment i) before and ii) after direct UHT heat treatment (143° C., 5 second), and carbohydrate processing iii) post UHT colloid mill and iv) pre-UHT amylase digestion, C) microscopy after UHT i) and colloid mill ii) and amylase digestion.
Figure 2:
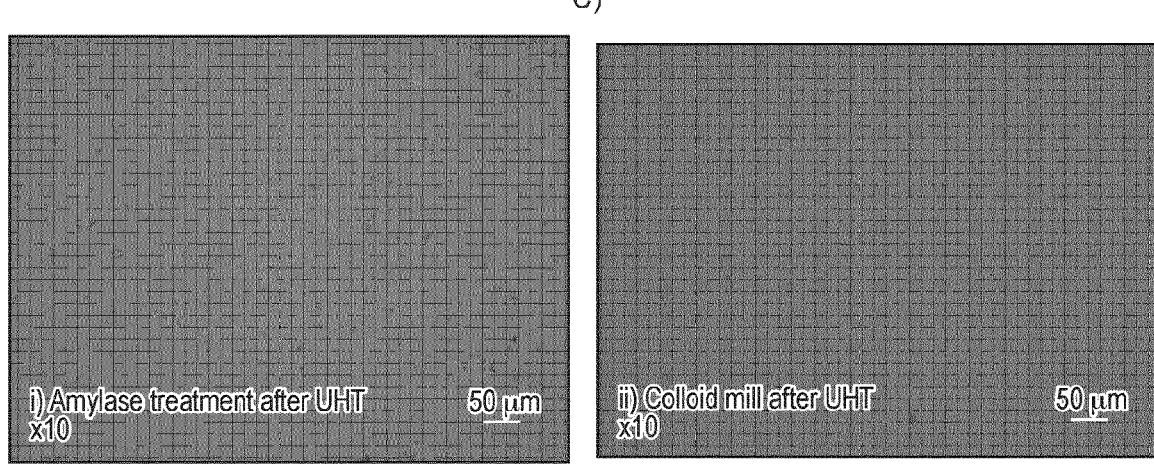
Figure 3:
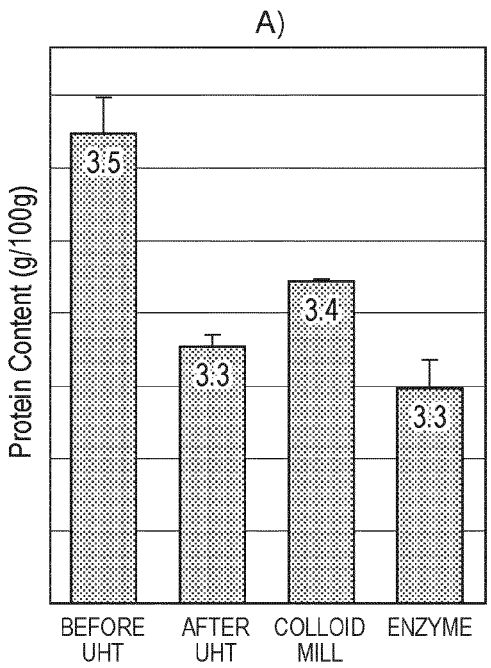
FIG. 3: Change in pea concentrate milk (6.5% pea concentrate, 2.6% fat, 0.8% sucrose) A) protein content and B) free glucose content as a function of heat treatment i) before and ii) after direct UHT heat treatment (143° C., 5 second), and carbohydrate processing iii) post UHT colloid mill and iv) pre-UHT amylase digestion.
Figure 3:
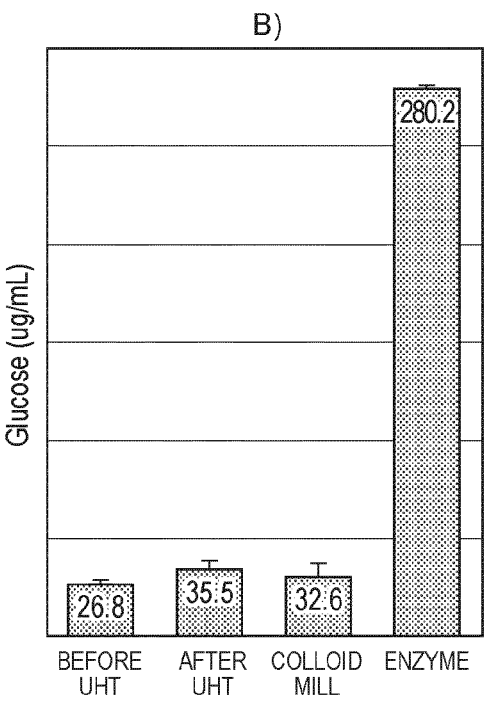

9 emulsion with a microscopy picture given in FIG. 2B was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The resulting product was cream in colour, had a much lower viscosity/texture compared to the reference product (FIG. 2A), and underwent sedimentation over a period of time (FIG. 4B). Analysis of the free glucose in the product before and after enzyme treatment reveals a modest increase in free glucose indicating the conversion of starch to glucose (FIG. 3B). What is surprising is that the final product contains only 0.4% starch a very low amount. Starch levels of >1 wt % are typically needed to build viscosity to 40 mPa·s at 10s$^{-1}$ at 25° C. in such a liquid product. It would not be expected that hydrolysis of such a small amount of starch leads to such a considerable viscosity reduction.

Example 3

Effect of Shear Treatment on Reducing Viscosity of Pea Based Liquid

The inventors discovered that product viscosity can also be surprisingly reduced using a thermo-mechanical treatment. A low viscosity pea milk product using high shear post UHT was produced as follows: 4.3 kg of pea protein concentrate (Ingredion Vitessence 1550) was dissolved in 56.3 kg of water at 50° C. with stirring, to this was added 235 grams of tricalcium phosphate, 100 grams of dipotassium phosphate, and 2 kg of sucrose. This mixture was mixed at 50° C. for 30 minutes to ensure complete dissolution. The pH of the mixture was then adjusted to 7.5 with 1M NaOH. 1.7 kg of oil was then added to the mix then final volume made to 65 litres and the oil was coarsely dispersed using a rotor stator mixer. A fine emulsion with a microscopy picture given in FIG. 2B was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The product was then passed through a rotor stator homogeniser (Silverson Verso—1.6 mm round mesh double stage) which was placed just after the UHT cooling tubes and before the filling station. The resulting product was cream in colour, and had a much lower viscosity/texture compared to the reference product (FIG. 2A) and underwent sedimentation over a period of time (FIG. 4C). Analysis of the free glucose in the product before and after enzyme treatment reveals that there was no change in free glucose indicating no conversion of starch to glucose (FIG. 3B). What is surprising is that such a mechanical treatment can decrease the viscosity of the product. Pre-homogenisation of the product before UHT using a high shear homogeniser does not lead to a product with lower viscosity (example 1), it is only when shear is applied after UHT that there is viscosity reduction.

Example 4

Production of a Reference Faba Milk Product

Ingredion FABA Concentrate—Vitessence Pulse 3600 or 3602 was used as a faba bean source. According to the manufacturer, it is 100% faba bean protein powder, derived from the dehulled split faba (or fava) bean cotyledons of faba (or fava) beans (*Vicia faba*)). It has maximum moisture content of 9%, minimum protein content of 60% (dry basis),

10 minimum starch content of 4% (dry basis), and a maximum fat content of 4% (dry basis).

Figure 5:
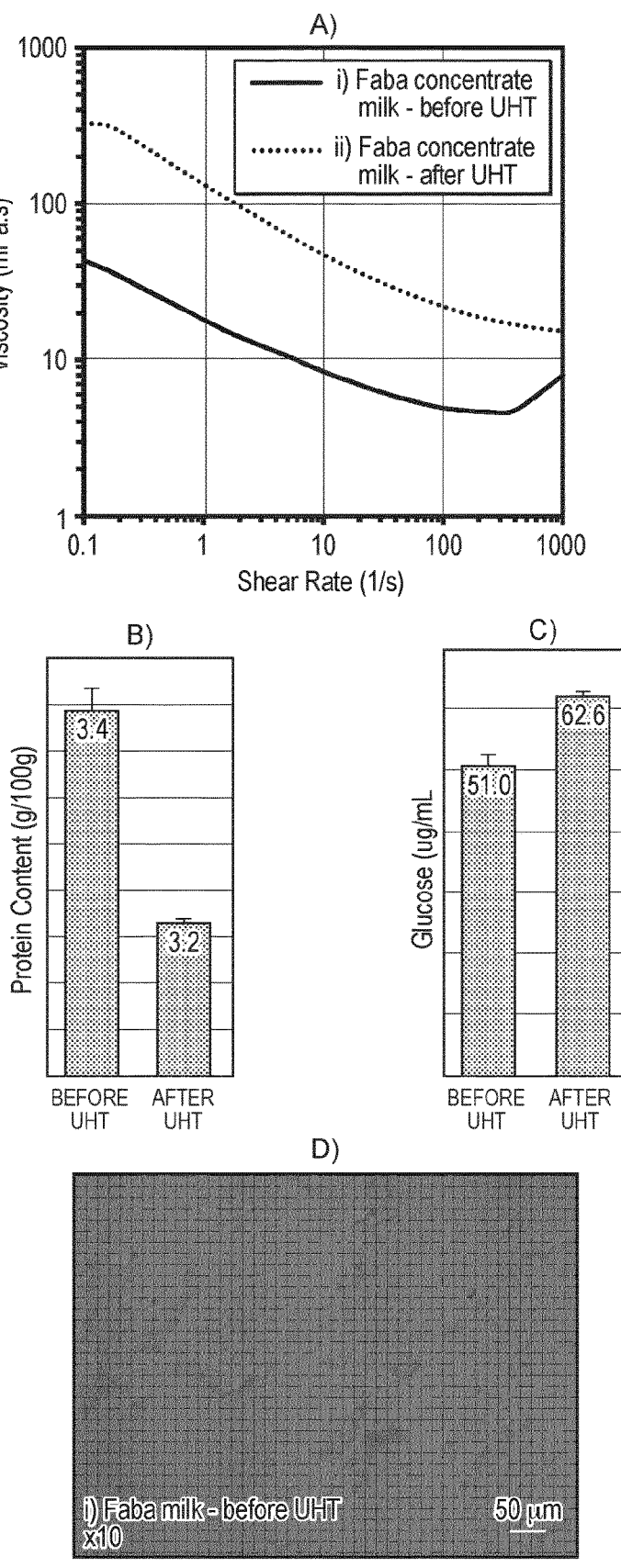
FIG. 5: Change in FABA concentrate milk (5.8% faba concentrate, 2.6% fat, 0.8% sucrose) A) viscosity, B) protein content and C) free glucose content, as a function of heat treatment i) before and ii) after direct UHT heat treatment (143° C., 5 second) and D) Microscopy DIC ×10 of faba milk i) before UHT, ii) after UHT treatment.
Figure 8:
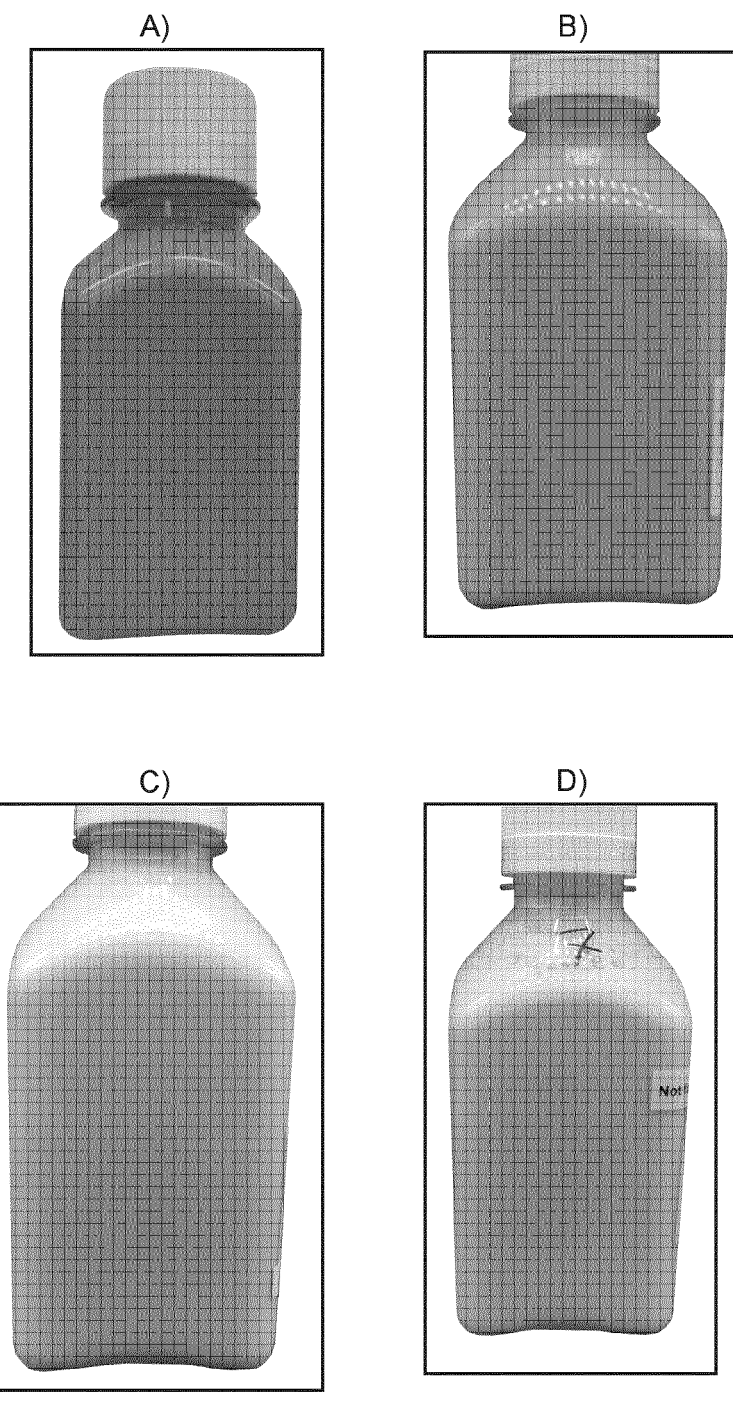
FIG. 8: A) Visual appearance of FABA reference milk after UHT, B) visual appearance of FABA-enzyme milk after UHT, and C) Visual appearance of FABA-enzyme and sodium ascorbate milk after UHT.

3.8 kg of faba concentrate was dissolved in 56.3 kg of water at 50° C. with stirring, to this was added 235 grams of tricalcium phosphate, 100 grams of dipotassium phosphate, and 2 kg of sucrose. This mixture was mixed at 50° C. for 30 minutes to ensure complete dissolution. The pH of the mixture was then adjusted to 7.5 with 1M NaOH. 1.7 kg of oil was then added to the mix then final volume made to 65 litres and the oil was coarsely dispersed using a rotor stator mixer. A fine emulsion with a microscopy picture given in FIG. 5D was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The resulting product was light grey in colour (FIG. 8A), underwent a considerable increase in viscosity/texture (FIG. 5A), and underwent sedimentation over a period of time (FIG. 8A).

Figure 6:
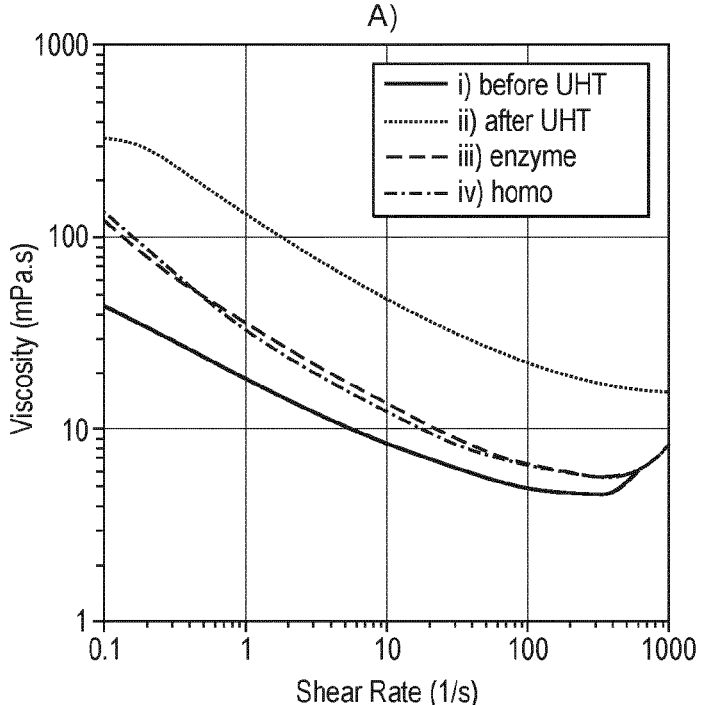
FIG. 6: Change in FABA concentrate milk (5.8% faba concentrate, 2.6% fat, 0.8% sucrose) A) and B) viscosity as a function of heat treatment i) before and ii) after direct UHT heat treatment (143° C., 5 second), and carbohydrate processing iii) pre-UHT amylase digestion, iv) post UHT colloid mill, C) microscopy ×10 after UHT i) and amylase digestion, ii) and amylase digestion with sodium ascorbate, D) microscopy ×10 and post UHT shear.
Figure 6:
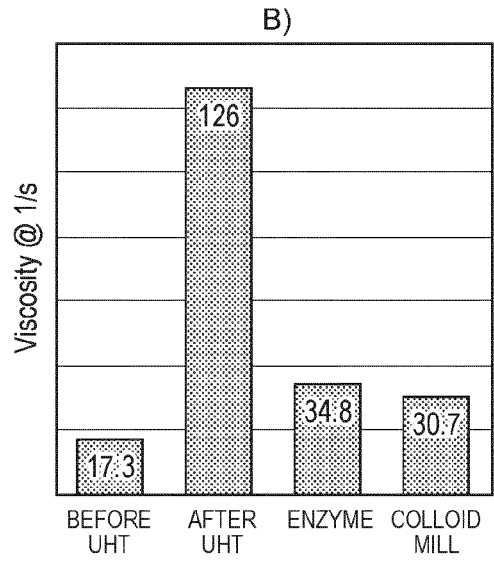
Figure 6:
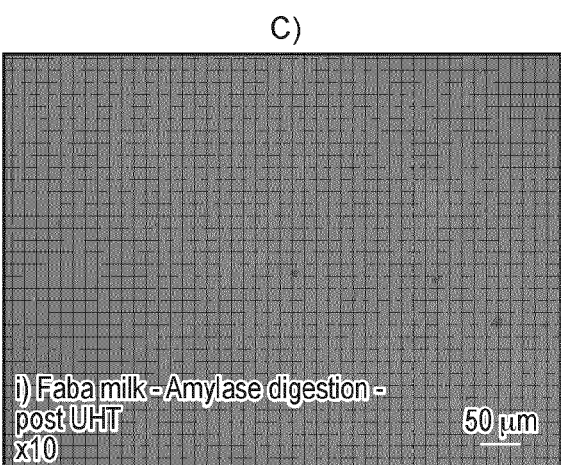
Figure 6:
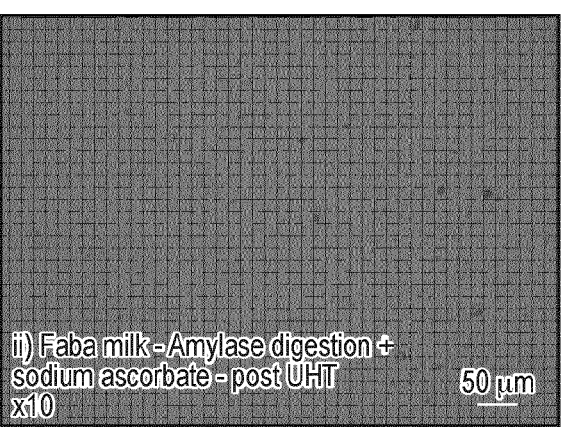
Figure 6:
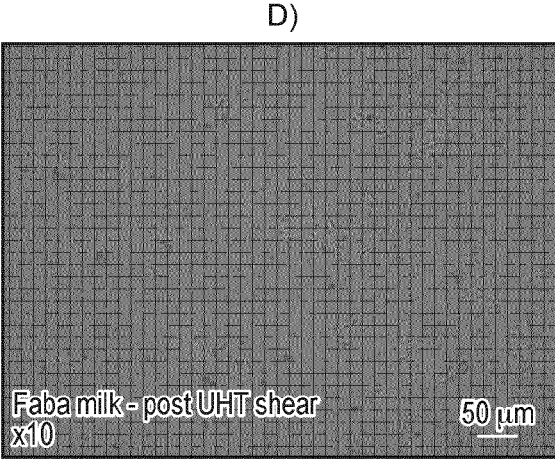
Figure 7:
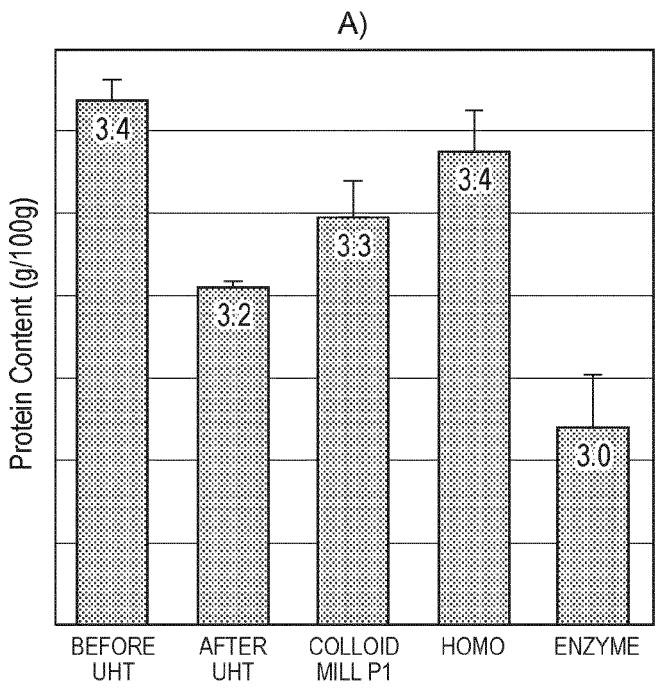
FIG. 7: Change in FABA concentrate milk (5.8% faba concentrate, 2.6% fat, 0.8% sucrose) A) protein content and B) free glucose content as a function of heat treatment i) before and ii) after direct UHT heat treatment (143° C., 5 second), and carbohydrate processing iii) and iv) post UHT colloid mill and v) pre-UHT amylase digestion.
Figure 7:
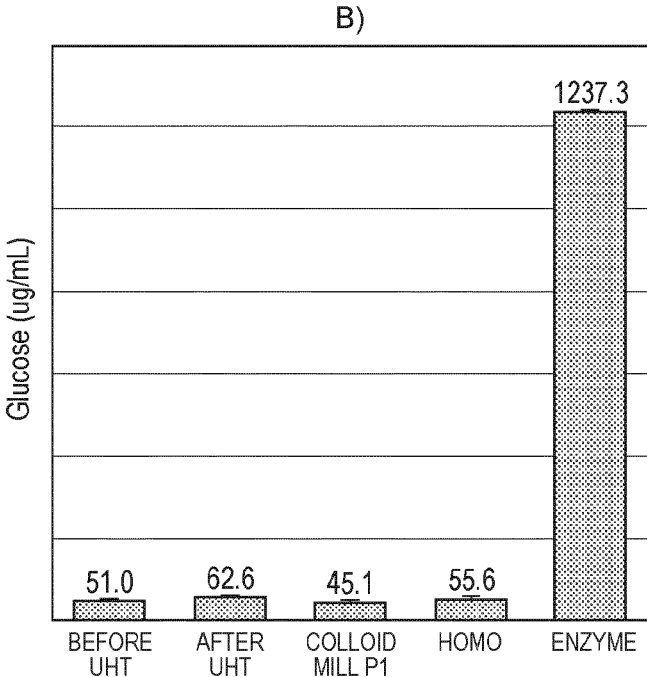

Example 5: Effect of Enzymatic Treatment on Reducing Viscosity of Faba Milk Product 3.8 kg of faba bean pea protein concentrate (Ingredion Vitessence 3600 or 3602) was dissolved in 56.3 kg of water at 50° C. with stirring, to this was added 235 grams of tricalcium phosphate, 100 grams of dipotassium phosphate, and 2 kg of sucrose. This mixture was mixed at 50° C. for 30 minutes to ensure complete dissolution. The pH of the mixture was then adjusted to 7.5 with 1M NaOH. 52 grams of amylase (BAN480 or BAN 800) and 13 grams of glycosylate (AMG 1100) were dissolved in the pea concentrate mixture. This mixture was incubated at 65° C. for two hours. 1.7 kg of oil was then added to the mix then final volume made to 65 litres and the oil was coarsely dispersed using a rotor stator mixer. A fine emulsion with a microscopy picture given in FIG. 6C i) was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The resulting product had a much lower viscosity/texture compared to the reference product (FIGS. 6A & B), was cream dark grey in colour (FIG. 8B) and underwent sedimentation over a period of time. Analysis of the free glucose in the product before and after enzyme treatment reveals a modest increase in free glucose indicating the conversion of starch to glucose (FIG. 7B). What is surprising is that the final product contains ≤0.5% starch a very low amount. Starch levels of >1 wt % are typically needed to build viscosity to 50 mPa·s at 10 s$^{-1}$ at 25° C. in such a liquid product. It would not be expected that hydrolysis of such a small amount of starch leads to such a considerable viscosity reduction.

Example 6: Effect of Enzymatic Treatment+EDTA in Faba Milk Product 3.8 kg of FABA bean protein concentrate (Ingredion Vitessence 3600 or 3602) was dissolved in 56.3 kg of water at 50° C. with stirring, to this was added 235 grams of tricalcium phosphate, 100 grams of dipotassium phosphate, 50 grams of sodium Ethylenediaminetetraacetic acid, and 2 kg of sucrose. This mixture was mixed at 50° C. for 30 minutes to ensure complete dissolution. The pH of the mixture was then adjusted to 7.5 with 1M NaOH. 52 grams of amylase (BAN480 or BAN 800) and 13 grams of glyco-sylate (AMG 1100) were dissolved in the faba concentrate mixture. This mixture was incubated at 65° C. for two hours. 1.7 kg of oil was then added to the mix then final volume made to 65 litres and the oil was coarsely dispersed using a rotor stator mixer. A fine emulsion was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. What is surprising is that the final product remains strongly grey despite the addition of EDTA to chelate the iron to avoid the formation of the iron tannic acid complex (FIG. 9 iv)).

Figure 9:
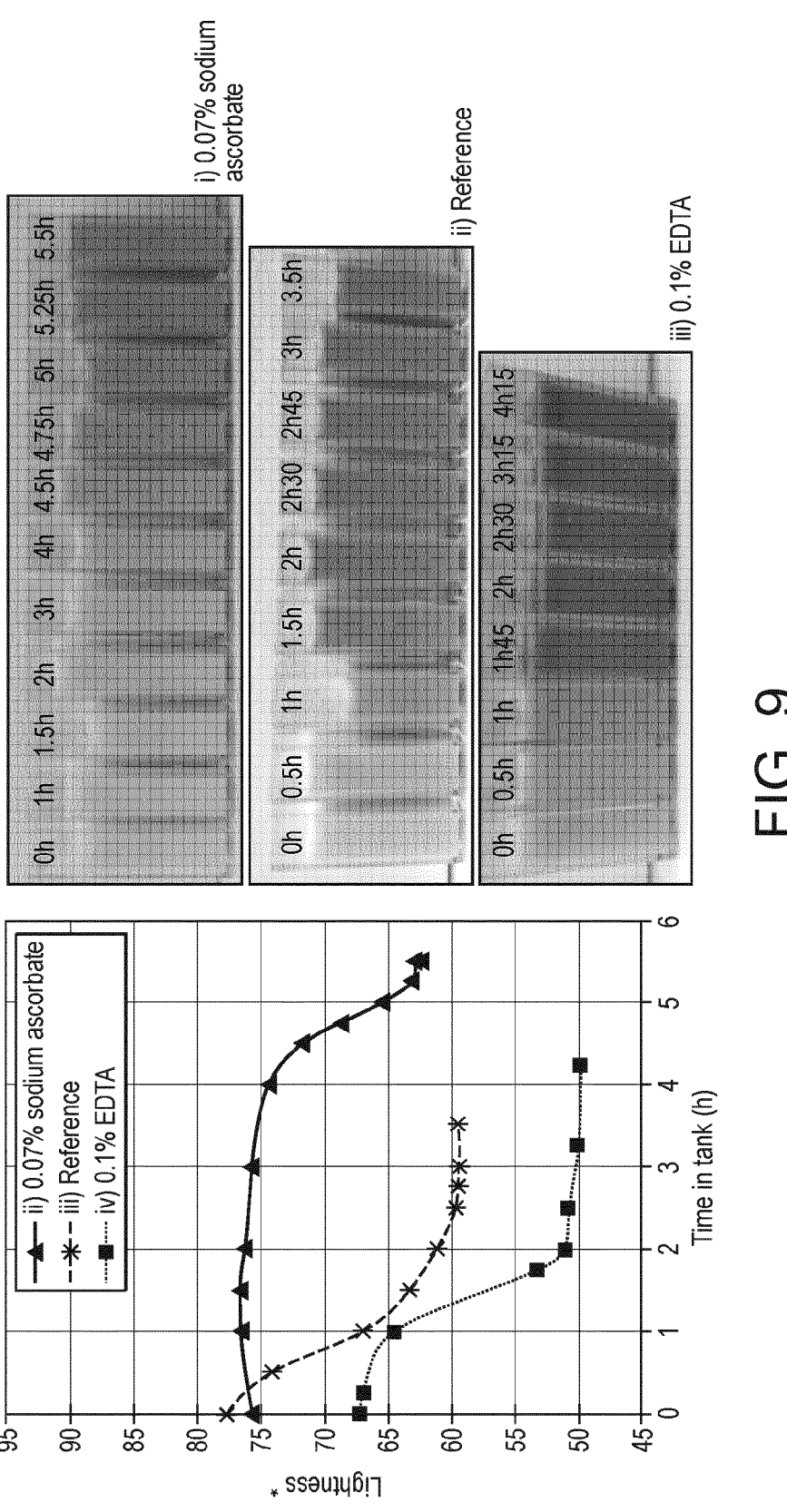
FIG. 9: Change in faba concentrate milk (5.8% faba concentrate, 0.8% sucrose, 2.6% fat) color (lightness*) during incubation at 65° C. in steel tank as function of addition of i) 0.07% sodium ascorbate, ii) no addition (reference), iii) 0.1% EDTA

Example 7: Effect of Enzymatic Treatment+NaAscorbate in Faba Milk Product 3.8 kg of FABA bean protein concentrate (Ingredion vitessence 3600 or 3602) was dissolved in 56.3 kg of water at 50° C. with stirring, to this was added 235 grams of tricalcium phosphate, 100 grams of dipotassium phosphate, 45 grams of sodium Ascorbate, and 2 kg of sucrose. This mixture was mixed at 50° C. for 30 minutes to ensure complete dissolution. The pH of the mixture was then adjusted to 7.5 with 1M NaOH. 52 grams of amylase (BAN480 or BAN 800) and 13 grams of glycosylate (AMG 1100) were dissolved in the pea concentrate mixture. This mixture was incubated at 65° C. for two hours. 1.7 kg of oil was then added to the mix then final volume made to 65 litres and the oil was coarsely dispersed using a rotor stator mixer. A fine emulsion with a microscopy picture given in FIG. 6C ii) was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The resulting product was cream in colour (FIG. 8C), had a much lower viscosity/texture compared to the reference product (FIG. 6A), and underwent sedimentation over a period of time (FIG. 8C). Analysis of the free glucose in the product before and after enzyme treatment reveals a large increase in free glucose indicating the conversion of starch to glucose (FIGS. 7A and 7B). What is surprising is that the final product has a cream colour with no evidence of grey colour. It is highly surprising that sodium ascorbate has superior performance compared to EDTA which is widely known as the best chelator of iron.[5] The discoloration of faba milk samples was evaluated analysing the lightness by CIE L*a*b* colorimeter upon time of incubation at 65° C. (FIG. 9).

Figure 13:
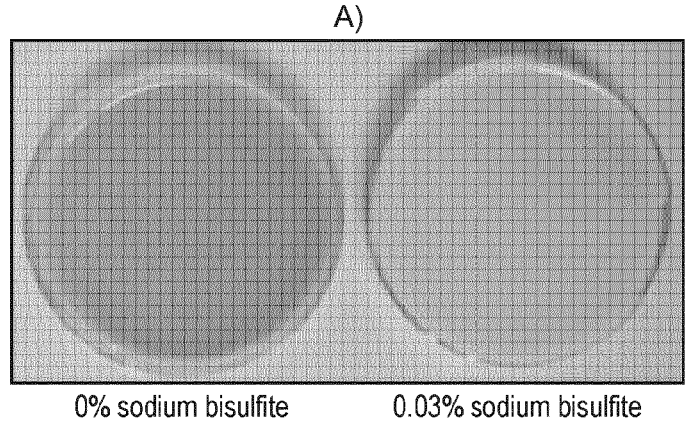
FIG. 13: Change in faba emulsion (4.2% faba concentrate, 3.5% fat) A) colour and B) Lightness*, after heating in steel tank at 85° C. as function of sodium bisulfite addition i) no sodium bisulfite addition and ii) 0.03% w/w sodium bisulfite addition.
Figure 13:
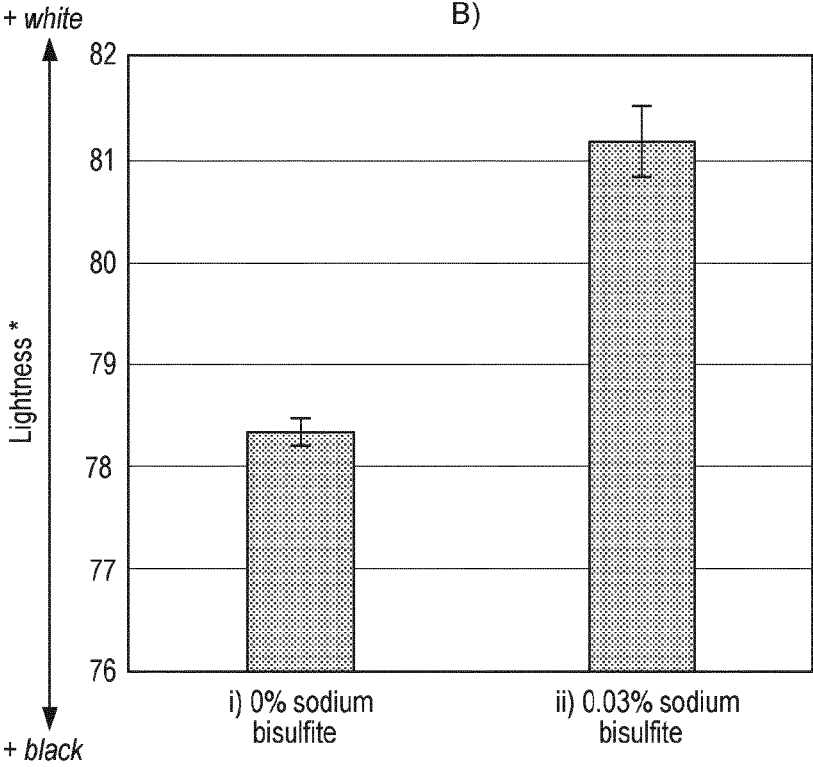

Example 8: Effect of Sodium Bisulfite as Alternative to Sodium Ascorbate for Colour Stability 250 g of faba bean protein concentrate (Ingredion Vites-sence 3600) was dissolved in 5.54 kg of water at 50° C. with stirring. The protein solution was separated in two batches. In batch 1, 105 g of sunflower was added under stirring. In batch 2, 105 g of sunflower oil and 0.9 g of sodium bisulfite was added under stirring. The pH of both mixture was then adjusted to pH 7.5 with 1M NaOH. A fine emulsion was created by passing both mixture through a two-stage high pressure homogeniser (400/80 bar first/second stage homogenisation pressures). The two obtained emulsion were heated to 85° C. for 30 minutes in steel tank. The resulting products were different in colour after heating step. The batch without sodium bisulfite went light grey while the batch with sodium bisulfite stayed light beige (FIG. 13). The discoloration of faba emulsion samples were evaluated analysing the lightness by CIE L*a*b* colorimeter compar-ing the emulsion with and without addition of sodium bisulfite. It shows that in the same processing conditions, sodium bisulfite prevent grey color formation. Therefore, using reducing agent such as sodium ascorbate or sodium bisulfite prevents oxidation of iron present in faba concen-trate, and limit complexation of iron with tannins in such conditions.

Example 9: Viscosity Reduction of FABA Milks Via Shear Treatment 3.8 kg of FABA bean protein concentrate (Ingredion vitessence 3600 or 3602) was dissolved in 56.3 kg of water at 50° C. with stirring, to this was added 235 grams of tricalcium phosphate, 100 grams of dipotassium phosphate, 2 kg of sucrose and 45 g of sodium ascorbate. This mixture was mixed at 50° C. for 30 minutes to ensure complete dissolution. The pH of the mixture was then adjusted to 7.5 with 1M NaOH. 1.7 kg of oil was then added to the mix then final volume made to 65 litres and the oil was coarsely dispersed using a rotor stator mixer. A fine emulsion with a microscopy picture given in FIG. 6D was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The product was then passed through a rotor stator homogeniser (Silverson Verso—1.6 mm round mesh double stage) which was placed just after the UHT cooling tubes and before the filling station. The resulting product was cream in colour, had a much lower viscosity/texture compared to the reference product (FIGS. 6A and B), and underwent sedimentation over a period of time (FIG. 8D). Analysis of the free glucose in the product before and after enzyme treatment reveals that there was no change in free glucose indicating no conversion of starch to glucose (FIG. 7B). What is surprising is that such a mechanical treatment can decrease the viscosity of the product. Pre-homogenisation of the product before UHT using a high shear homogeniser does not lead to a product with lower viscosity (example 1), it is only when shear is applied after UHT that there is viscosity reduction.

Figure 10:
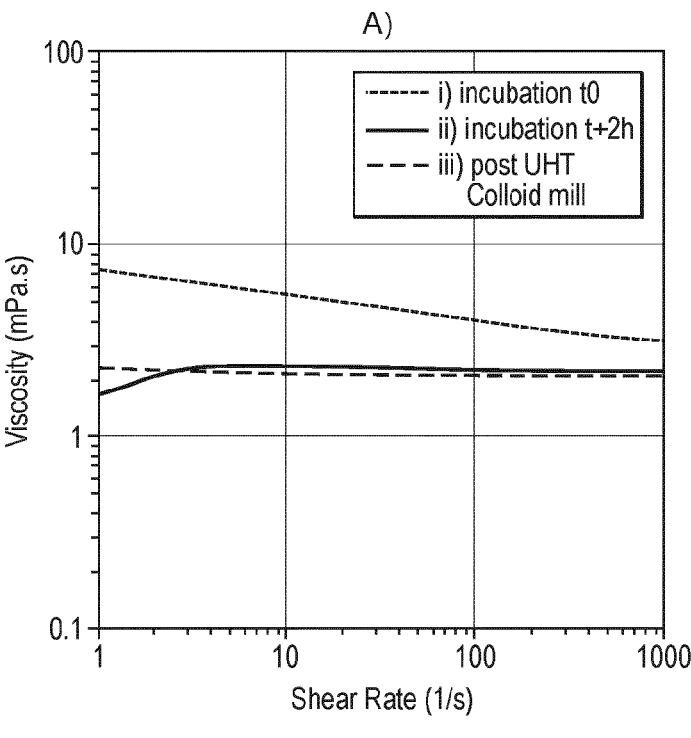
FIG. 10: Change in chickpea concentrate solution (4.2% chickpea concentrate, 3.25% sucrose) viscosity as function of incubation time with enzymes at 65° C. i) after 0 min ii) after 2 h, and chickpea concentrate milk (4.2% chickpea concentrate, 3.25% sucrose, 3.5% fat) viscosity iii) after direct UHT heat treatment (143° C., 5 second) and post UHT colloid mill.
Figure 10:
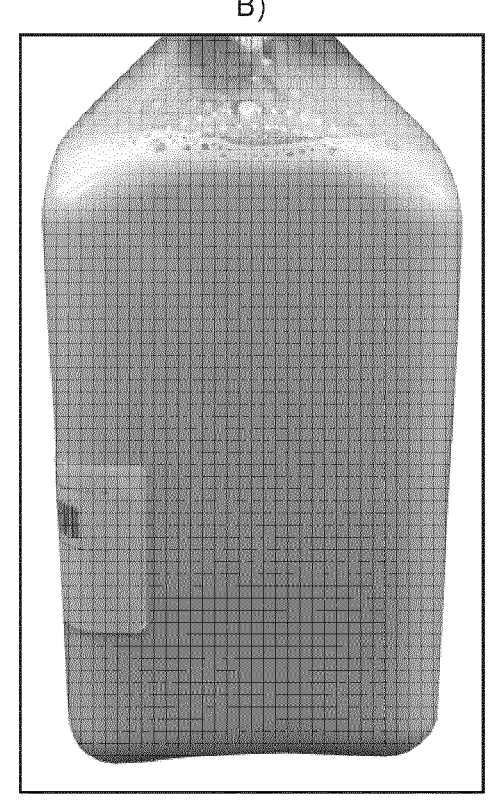

Example 10: High Shear Post UHT Treatment of Chickpea Based Milk 1.46 kg of chickpea protein concentrate (Innovopro—CP-Pro-70, comprising about 69 wt % protein) was dissolved in 30.30 kg of water at 50° C. with stirring, to this was added 126 grams of tricalcium phosphate, 56 grams of dipotassium phosphate, and 1.14 kg of sucrose. This mixture was mixed at 50° C. for 30 minutes to ensure complete dissolution. The pH of the mixture was then adjusted to 7.5 with 1M NaOH. 28 grams of amylase (BAN480 or BAN 800) and 7 grams of glycosylate (AMG 1100) were dissolved in the chickpea concentrate mixture. This mixture was incubated at 65° C. for two hours and showed a clear reduction in viscosity of the protein solution between time 0 and 2 hours incubation (FIG. 10A). 1.26 kg of oil was then added to the mix, then final volume made to 35 litres, and the oil was coarsely dispersed using a rotor stator mixer. A fine emulsion was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The product was then passed through a rotor stator homogeniser (Silverson Verso—1.6 mm round mesh double stage) which was placed just after the UHT cooling tubes and before the filling station. The resulting product was cream in colour (FIG. 10B), showing no increase in viscosity after UHT (FIG. 10A).

Figure 11:
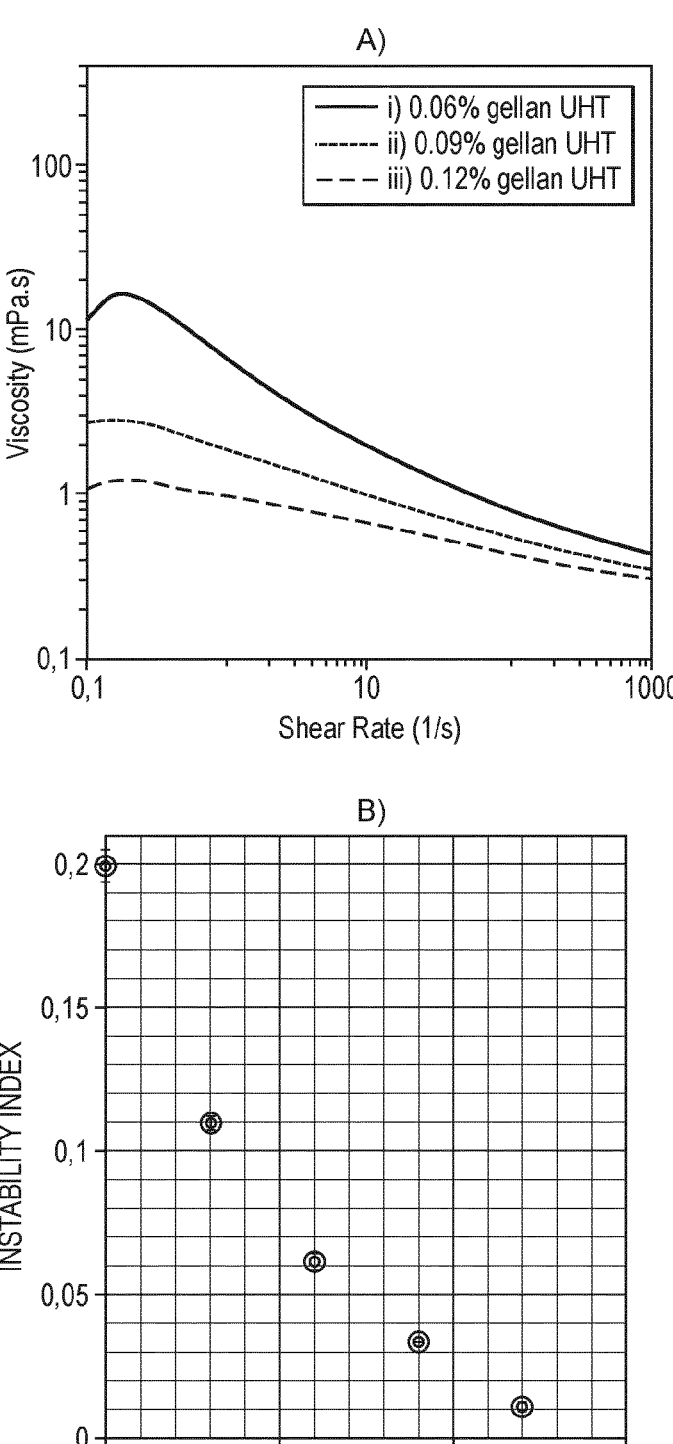
FIG. 11: Change in Faba concentrate milk alternative (4.15% faba concentrate, 3.25% sucrose, 3.5% fat) A) viscosity or B) lumifuge instability index of C)-E) shelf stability after 25 days at 25° C. as function of gellan content.
Figure 11:
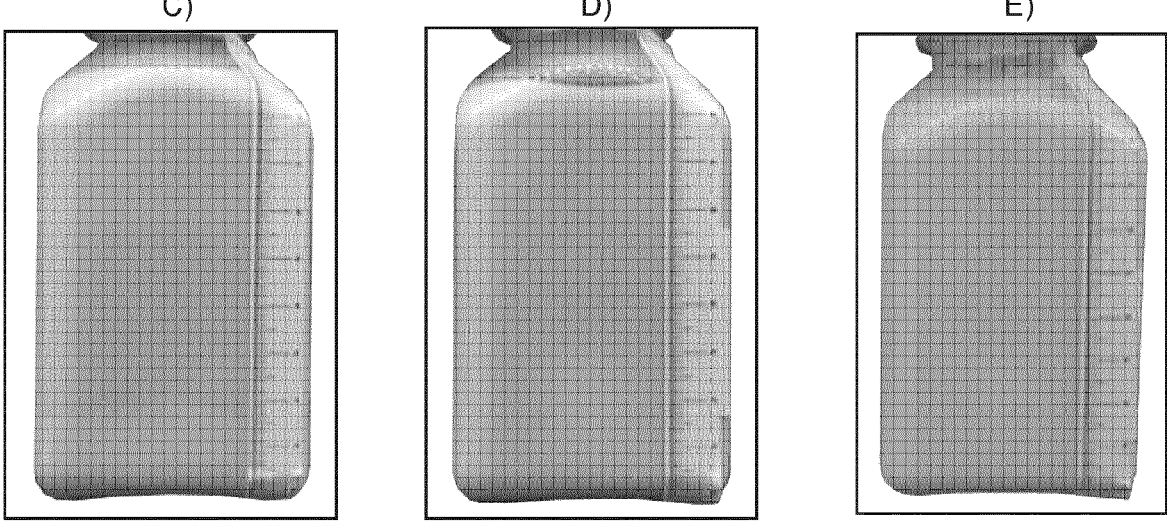

Example 11: Effect of Hydrocolloids on Enzymatic Treatment+NaAscorbate in Faba Milk Product with 2.2% Protein 2.7 kg of *FABA* bean protein concentrate (Ingredion vitessence 3600 or 3602) was dissolved in 56.3 kg of water at 50° C. with stirring, to this was added 192 grams of dipotassium phosphate, grams of sodium Ascorbate, and 2 kg of sucrose. This mixture was mixed at 50° C. for 30 minutes to ensure complete dissolution. The pH of the mixture was then adjusted to 7.5 with 1M NaOH. 52 grams of amylase (BAN480 or BAN 800) and 13 grams of glycosylate (AMG 1100) were dissolved in the faba concentrate mixture. This mixture was incubated at 65° C. for two hours. 38 to 78 grams of high acetyl gellan (DSM ND-103B) was added to the mix under stirring using a rotor stator mixer. 1.7 kg of oil was added to the mix, the final volume was made up to 65 litres and the oil was coarsely dispersed using a rotor stator mixer. A fine emulsion was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The viscosity of the final products systematically increased with gellan content (FIG. 11A) but were always much lower viscosity/texture compared to the reference product (FIG. 5A) especially at medium shear rates (above 10 s$^{-1}$) which are relevant for generating appealing product mouthfeel. Importantly the resulting products had superior creaming/sedimentation stability of time as measured by the Lumisizer accelerated shelf life tester (FIG. 11B). Products with >0.06 wt % gellan were seen not to undergo sedimentation over a period of 25 days at 25° C. (FIGS. 11C-E).

Figure 12:
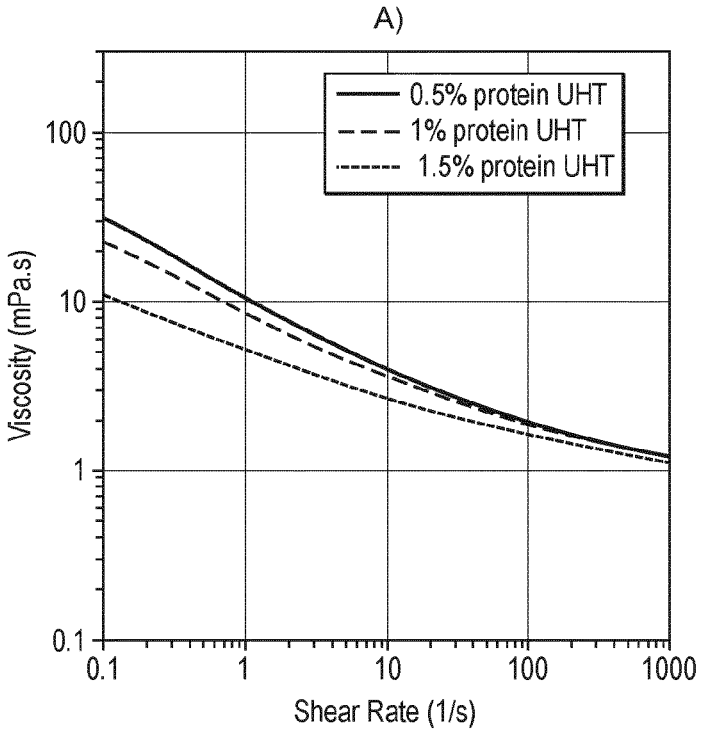
FIG. 12: Change in Faba coffee creamer (0.85 to 2.5% Faba concentrate, 27% sucrose, 7.5% fat) A) viscosity and B)-D) shelf stability after 25 days at 25° C. as function of Faba protein content (0.5 to 1.5% Faba protein) in the prescence of 0.06 wt % gellan and 0.06 wt % guar gum.
Figure 12:
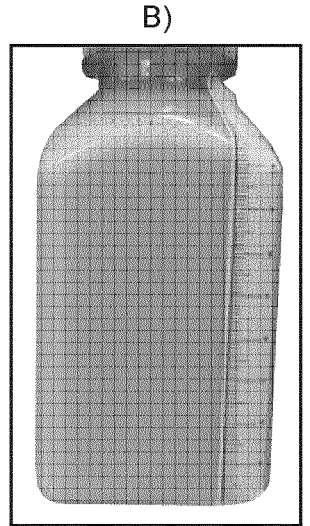
Figure 12:
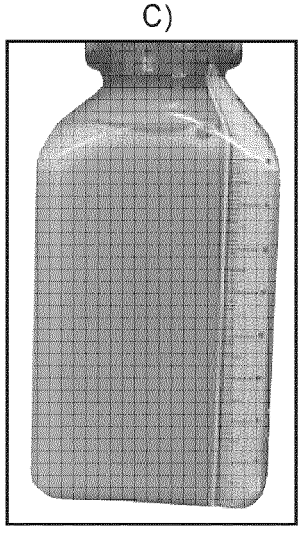
Figure 12:
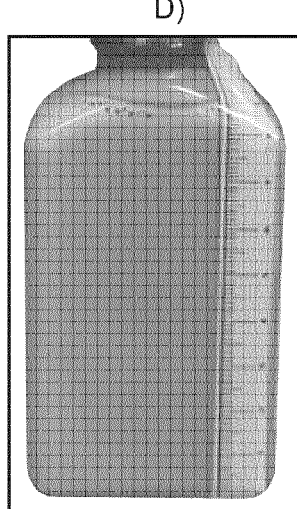

Example 12: Effect of Protein and Enzymatic Treatment+NaAscorbate in Faba Creamer Product with 0.06% Guar and 0.06% Gellan Gum 0.5 kg to 1.5 kg of FABA bean protein concentrate (Ingredion vitessence 3600 or 3602) was dissolved in 38.4 to 37.4 kg of water at 50° C. with stirring, to this was added 180 grams of dipotassium phosphate, 120 grams of trisodium citrate, 42 grams of sodium ascorbate, and 16 kg of sucrose. This mixture was mixed at 50° C. for 30 minutes to ensure complete dissolution. The pH of the mixture was then adjusted to 7.5 with 1M NaOH. 7 to 21 grams of amylase (BAN480 or BAN 800) and 1.7 to 5 grams of glycosylate (AMG 1100) were dissolved in the faba concentrate mixture. This mixture was incubated at 65° C. for two hours. 36 g of high acetyl gellan (DSM ND-103B) and 36 grams of guar gum (Cargill, Viscogum MP41230) was added to the mix under stirring using a rotor stator mixer. 4.5 kg of oil was then added to the mix, the final volume was made to 60 litres and the oil was coarsely dispersed using a rotor stator mixer. A fine emulsion was then created by passing through a two-stage high pressure homogeniser (400 bar/80 bar first/second stage homogenisation pressures). The product was rendered microbiologically stable by thermal treatment with an ultra-high temperature treatment (UHT) of 143° C., 5 seconds. The viscosity of the final products showed much lower viscosity/texture (FIG. 12A) compared to the reference product (FIG. 5A) especially at medium shear rates (above 10 s$^{-1}$) which are relevant for generating appealing product mouthfeel. In low shear rate region, under 10 s$^{-1}$, it seems that lower protein content leads to higher viscosity. No significant differences were seen especially above medium and high shear rate of 10 s$^{-1}$. Products show a creamy colour and were seen not to undergo sedimentation or creaming over a period of 25 days at 25° C. (FIGS. 12B-D).

Figure 14:
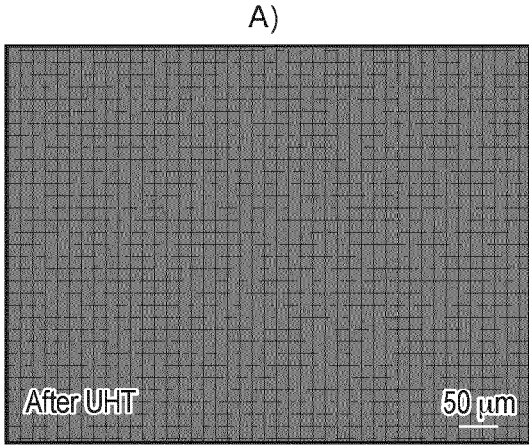
Figure 14:
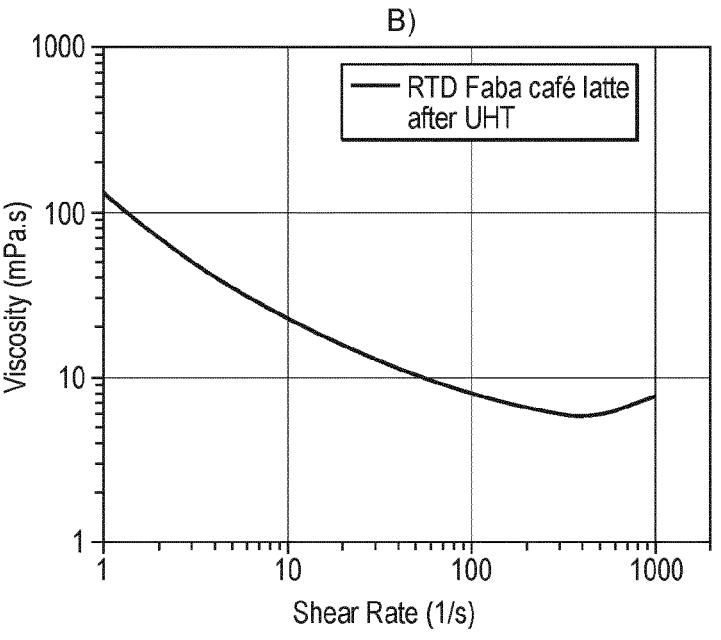
Figure 14:
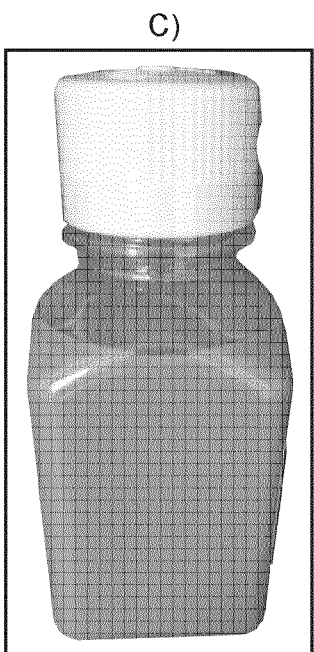

Example 13: Effect of Coffee Addition in Faba Milk Product for RTD Faba Café Latte 0.5 kg to 2.0 kg of FABA bean protein concentrate (Ingredion vitessence 3600 or 3602) was dissolved in 43 kg of water at 50° C. with stirring, to this was added 200 grams of dipotassium phosphate, 40 grams of sodium ascorbate, 100 g of trisodium citrate and 2.5 kg of sucrose. This mixture was mixed at 50° C. for 30 minutes to ensure complete dissolution. The pH of the mixture was then adjusted to 7.3 with 1M NaOH. 52 grams of amylase (BAN480 or BAN 800) and 13 grams of glycosylate (AMG 1100) were dissolved in the faba concentrate mixture. This mixture was incubated at 65° C. for two hours. 40 to 80 grams of high acetyl gellan (DSM ND-103B) was added to the mix under stirring using a rotor stator mixer. 1.0 kg to 1.4 kg of oil and 500 g to 750 g of soluble coffee was added to the mix and the final volume was adjusted to pH 7.3 with NaOH 1M and made up to 50 litres. The oil was coarsely dispersed using a rotor stator mixer. A fine emulsion was then created by passing through a two-stage high pressure homogeniser (350 bar/80 bar first/second stage homogenisation pressures). The product was rendered microbiologically stable by thermal treatment with an ultra-high temperature treatment (UHT) of 143° C., 5 seconds. The viscosity of the final product coffee faba milk was similar to the faba milk itself (FIG. 14B), especially at medium shear rates (above 10 s$^{-1}$) which are relevant for generating appealing product mouthfeel. The faba milk mixed with soluble coffee shows very good acid stability, without emulsion aggregation (FIG. 14A), which is relevant for generating appealing ready to drink dairy alternative coffee mixed. Products with >0.10 wt % gellan were seen not to undergo sedimentation or creaming over a period of 4 weeks at 38° C. (FIG. 14C).

The invention claimed is:

1. A method of making a plant based liquid, the method comprising:
   a) dissolving 0.5 to 20 weight percentage (wt %) dry fractionated plant protein in water to form a plant protein mixture with a pH between 6.7 and 9, wherein the wt % of the dry fractionated plant protein is based on the total weight of the plant protein mixture, wherein a phosphate source and a sugar are dissolved in the plant protein mixture, and wherein the phosphate source comprises tricalcium phosphate and dipotassium phosphate;
   b) dispersing triglyceride in the plant protein mixture;
   c) homogenizing the plant protein mixture to form an emulsion;
   d) applying a thermal treatment to the emulsion; and e) applying a shear treatment to the thermal treated emulsion to form the plant based liquid, wherein the viscosity of the plant based liquid after the shear treatment is between 0.5 and 30 mPa·s at a shear rate of $10 \text{ s}^{-1}$ at 25° C.

2. The method according to claim 1, wherein sodium ascorbate is dissolved in the plant protein mixture or the emulsion.

3. The method according to claim 1, wherein the dry fractionated plant protein is derived from a legume source.

4. The method according to claim 1, wherein the dry fractionated plant protein is an air classified plant protein source.

5. The method according to claim 1, wherein the plant protein mixture is adjusted to a pH of between 7 to 8 followed by incubating with enzymes.

6. The method according to claim 5, wherein the enzymes are amylase and amyloglucosidase.

7. The method according to claim 1, wherein the emulsion is formed using a two-stage high pressure homogenizer.

8. The method according to claim 1, wherein the emulsion average particle size is between 0.1 and 1 μm for d[3,2] and 0.3 and 2 μm for d[4,3].

9. The method according to claim 1, wherein the shear treatment is applied using a high shear homogenizer.

10. The method according to claim 1, wherein the plant based liquid comprises less than 2 wt % starch.

11. The method according to claim 1, wherein the plant based liquid is a milk analogue.

12. A plant based milk analogue made by a method according to claim 1.

13. A method comprising thermal treatment followed by shear treatment to make a plant based liquid from an emulsion comprising plant protein and triglyceride, wherein the plant protein is a dry fractionated plant protein, wherein the viscosity of the plant based liquid resulting from the shear treatment is between 0.5 and 30 mPa·s at a shear rate of $10 \text{ s}^{-1}$ at 25° C.

14. The method according to claim 1, wherein the plant protein mixture has a pH between 6.7 and 8.

15. The method according to claim 1, wherein the fat emulsion average particle size is between 0.1 and 0.7 for d[3,2] and 0.3 and 1 μm for d[4,3].

16. The method according to claim 1, further comprising incubating the plant protein mixture with enzymes prior to step (b).

17. The method according to claim 1, further comprising adding a hydrocolloid to the plant protein mixture prior to step (b).

18. The method according to claim 1, wherein the dry fractionated plant protein has a starch fraction of between 5 to 14 wt % on a dry basis.

19. The method according to claim 1, wherein the dry fractionated plant protein has a protein content of between 50 to 70 wt % on a dry basis.

20. The method according to claim 9, wherein the plant based liquid having the viscosity between 0.5 and 30 mPa·s at a shear rate of $10 \text{ s}^{-1}$ at 25° C. is the product resulting from the shear treatment.

\* \* \* \* \*